(12) United States Patent
Iezzi et al.

(10) Patent No.: US 12,367,775 B2
(45) Date of Patent: Jul. 22, 2025

(54) UNMANNED AERIAL VEHICLE COMMUNICATIONS SYSTEM

(71) Applicant: Aeronix, Inc., Melbourne, FL (US)

(72) Inventors: Steven L. Iezzi, Melbourne, FL (US); Jeffrey B. Smith, Rockledge, FL (US)

(73) Assignee: AERONIX, INC., Melbourne, FL (US)

( * ) Notice: Subject to any disclaimer, the term of this patent is extended or adjusted under 35 U.S.C. 154(b) by 579 days.

(21) Appl. No.: 16/932,000

(22) Filed: Jul. 17, 2020

(65) Prior Publication Data

US 2021/0020050 A1    Jan. 21, 2021

Related U.S. Application Data

(60) Provisional application No. 62/875,192, filed on Jul. 17, 2019.

(51) Int. Cl.
| | | |
|---|---|---|
| *G08G 5/26* | (2025.01) | |
| *B64U 10/13* | (2023.01) | |
| *G05D 1/00* | (2024.01) | |
| *G08G 5/55* | (2025.01) | |
| *G08G 5/57* | (2025.01) | |

(Continued)

(52) U.S. Cl.
CPC .............. *G08G 5/26* (2025.01); *G05D 1/0022* (2013.01); *G08G 5/55* (2025.01); *G08G 5/57* (2025.01); *H04B 7/18506* (2013.01); *H04W 4/40* (2018.02); *H04W 24/08* (2013.01);
(Continued)

(58) Field of Classification Search
CPC ...................... G08G 5/0004–0026; G08G 5/00
See application file for complete search history.

(56) References Cited

U.S. PATENT DOCUMENTS

| | | | | |
|---|---|---|---|---|
| 6,631,170 | B1 * | 10/2003 | Gu | H04B 1/0003 |
| | | | | 375/349 |
| 7,920,860 | B2 * | 4/2011 | Chari | H04B 7/18506 |
| | | | | 455/562.1 |

(Continued)

FOREIGN PATENT DOCUMENTS

| | | | |
|---|---|---|---|
| CN | 102076120 A | * | 5/2011 |
| KR | 20180054391 A | * | 5/2018 |

OTHER PUBLICATIONS

"Kovacs, I et al.; Interference analysis for UAV connectivity over LTE using aerial radio measurements; 2017; IEEE 86th Vehicular Technology Conference" (Year: 2017).*

*Primary Examiner* — Russell Frejd
*Assistant Examiner* — Christopher R Cardimino
(74) *Attorney, Agent, or Firm* — Kelly G. Swartz; Widerman Malek, PL

(57) ABSTRACT

A communication system for an unmanned aerial vehicle operating beyond visual line of sight may include an airborne radio and a plurality of ground radios. The airborne radio is carried by the unmanned aerial vehicle. The plurality of ground radios are in wireless communication with the airborne radio. Each of the plurality of ground radios includes a processor adapted to calculate one or more performance metrics related to communication between the airborne radio and a respective one of the plurality of ground radios. One of the plurality of ground radios is selected as an active ground radio based on the one or more performance metrics. The airborne radio is configured to receive control data only from the active ground radio.

20 Claims, 4 Drawing Sheets

(51) Int. Cl.
    *H04B 7/185*     (2006.01)
    *H04W 4/40*     (2018.01)
    *H04W 24/08*     (2009.01)
    *H04W 84/06*     (2009.01)

(52) U.S. Cl.
    CPC ............ *H04W 84/06* (2013.01); *B64U 10/13* (2023.01); *B64U 2201/20* (2023.01)

(56) References Cited

U.S. PATENT DOCUMENTS

| | | | | |
|---|---|---|---|---|
| 8,379,760 | B2 * | 2/2013 | Petilli | H03M 3/496 |
| | | | | 455/114.1 |
| 9,136,931 | B2 * | 9/2015 | Shattil | H04L 5/0035 |
| 10,659,146 | B2 * | 5/2020 | Frolov | H04B 7/18504 |
| 10,797,733 | B1 * | 10/2020 | Shattil | H04B 1/0003 |
| 10,897,304 | B2 † | 1/2021 | Olson | |
| 11,470,533 | B2 * | 10/2022 | Mackenzie | H04W 64/006 |
| 2007/0232299 | A1 † | 10/2007 | Alcorn | |
| 2011/0051868 | A1 * | 3/2011 | Roufoogaran | H04B 1/18 |
| | | | | 375/350 |
| 2015/0373615 | A1 * | 12/2015 | Hampel | H04L 45/34 |
| | | | | 370/329 |
| 2018/0011162 | A1 * | 1/2018 | Bovard | G01S 11/02 |
| 2018/0097560 | A1 * | 4/2018 | Jalali | H01Q 3/24 |
| 2019/0212724 | A1 * | 7/2019 | Phuyal | H04W 76/32 |
| 2021/0068026 | A1 * | 3/2021 | Wang | H04W 24/10 |
| 2021/0392710 | A1 * | 12/2021 | Yang | H04W 84/005 |

\* cited by examiner
† cited by third party

UNMANNED AERIAL VEHICLE COMMUNICATIONS SYSTEM

RELATED APPLICATIONS

This application claims priority under 35 U.S.C. § 119(e) of U.S. Provisional patent application Serial No. filed on Jul. 17, 2019 and titled MULTI-CHANNEL NARROWBAND DISCRIMINATOR. The content of this application is incorporated herein by reference.

FIELD OF THE INVENTION

The present invention relates to systems and methods for receiving, processing and decoding multiple parallel channels. More specifically, the present invention relates to a system and method for decoding multiple parallel channels to improve the scalability and reliability of the command and control data link as specified for a beyond the visual line of sight commercial Unmanned Airborne System.

BACKGROUND OF THE INVENTION

Flying unmanned aerial vehicles (UAVs) beyond the visual line of sight (BVLOS) represents the next big opportunity for commercial operators. BVLOS improves efficiency by allowing the operation to cover more distance and supports applications that could not be supported by visual operation. However, safety of flight is a significant technological challenge. UAVs out of visual sight may pose a threat to bystanders and property on the ground as well as manned commercial aviation. BVLOS technology must incorporate safety capability with a very high degree of success to be viable.

The Radio Technical Commission for Aeronautics (RTCA) is tasked with defining the requirements for safe operation of UAV.

The Control and Non-Payload Communications (CNPC) System was developed to meet RTCA requirements and provide an optimized network for Command and Control of BVLOS UAVs. CNPC utilizes multiple ground stations operating on the same frequency and simultaneously receiving information from any UAV within range.

A UAS operating under BVLOS rules may travel significant distances to support inspection or evaluation missions. The extended range will likely require multiple connections to maintain data rates and safe operation of the command and control data link. The UAS will make connections with multiple ground stations while flying an operational mission.

Therefore, a need exists for a novel networking and routing system and method to optimize performance by selecting the best ground station using communications and network performance parameters gathered from the UAV to ground stations links.

Further, a need exists for a system and method to monitor link performance as the UAV travels along its route and seamlessly (with zero packet loss) transition to alternate ground stations offering the best performance at the UAVs present location.

Further, a need exists for a system and method to dynamically determine the highest rate connection and maximize the channel performance for a given UAV.

Further, a need exists for a system and method to support all the functionality of existing redundant optimized data link, which is also scalable for multiple UAV in the same time and space.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a communication system for an unmanned aerial vehicle operating beyond visual line of sight including an airborne radio and a plurality of ground radios. The airborne radio may be carried by the unmanned aerial vehicle. The plurality of ground radios may be in wireless communication with the airborne radio.

Each of the plurality of ground radios may include a processor. The processor of the ground radio may be adapted to calculate one or more performance metrics related to communication between the airborne radio and a respective one of the plurality of ground radios. One of the plurality of ground radios may be selected as an active ground radio based on the one or more performance metrics. The airborne radio may be configured to receive control data only from the active ground radio.

The airborne radio may be configured as a master and each of the plurality of ground radios may subscribe to the airborne radio.

The processor of each of the plurality of ground radios may process data received from the airborne radio.

The communication system may also include an open shortest path first router having a routing table containing the one or more performance metrics of each of the plurality of ground radios.

The processor of the active ground radio may utilize the routing table to execute an algorithm to select an active ground radio to increase throughput between airborne radio and the active ground radio. The processor of each of the plurality of ground radios may execute a training sequence and derive the one or more performance metrics from communication received from the airborne radio during the training sequence.

Each of the plurality of ground radios may include only a single receiver adapted to receive a plurality of data channels centered at an intermediate frequency. The processor of each of the plurality of ground radios may be adapted to process a plurality of data channels. The processor may include a down converter adapted to receive the plurality of data channels and convert to an intermediate frequency signal having the intermediate frequency. The processor may include a plurality of processing paths wherein each of the plurality of processing paths may be adapted to receive the intermediate frequency signal having an the plurality of data channels and process one of the plurality of data channels. Each of the plurality of processing paths may operate simultaneously to process one of the data channels.

Each of the plurality of processing paths may include a baseband converter adapted to convert one of the plurality of data channels to a baseband frequency signal having a baseband frequency, A center frequency of each of the baseband frequency signals may be unique to each of the data channels. Each of the plurality of processing paths may include a narrow low pass finite impulse response filter adapted to discriminate a target data channel from the reset of the plurality of data channels. The center frequency of each of the plurality of data channels may be uniformly distributed around the intermediate frequency. Each center frequency may be an equal interval away from each adjacent center frequency.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
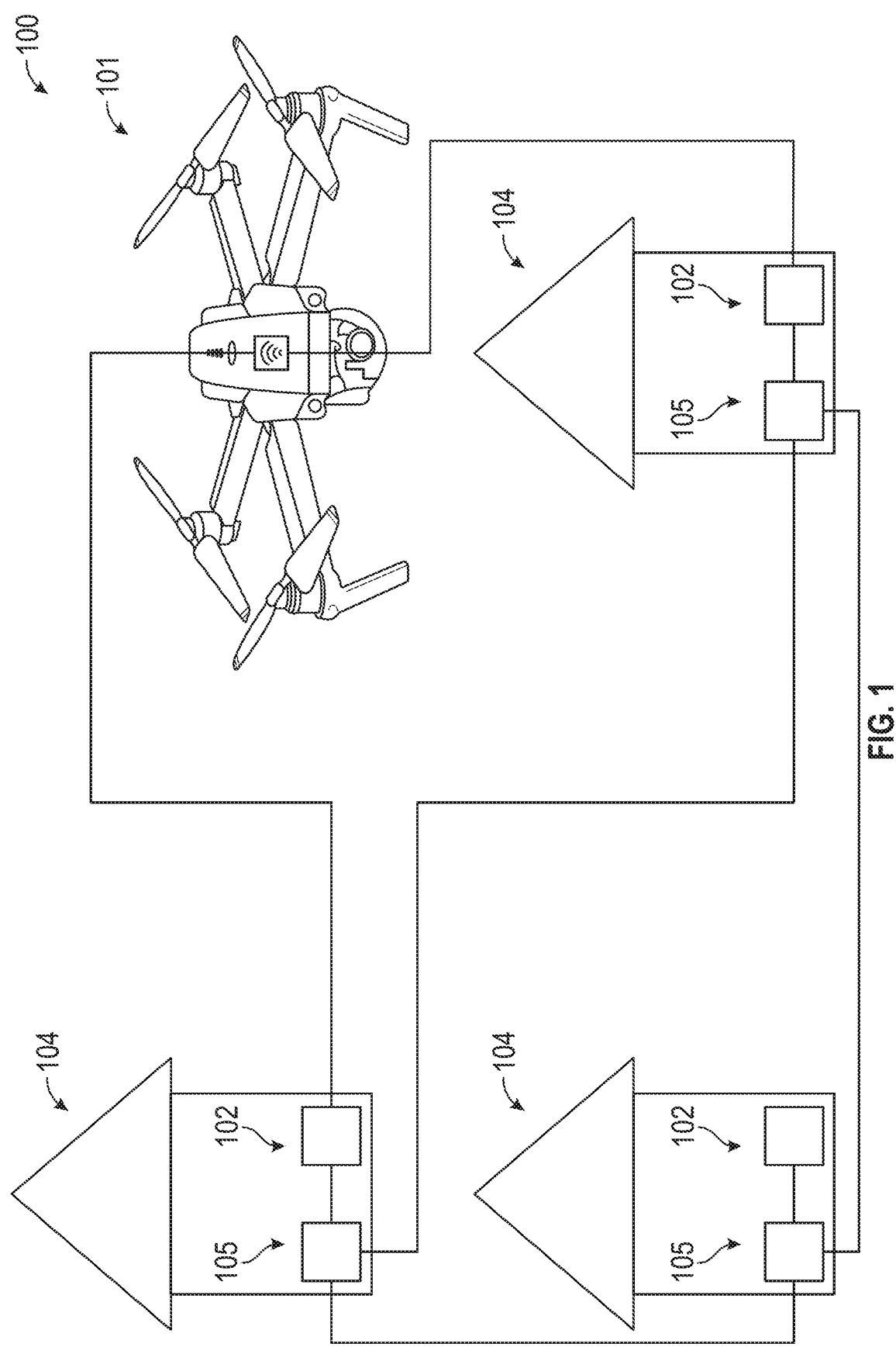
FIG. 1 is a block diagram of the communication system in accordance with an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure, Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system and method including a network 100 of a plurality of airborne radios 101, each installed on an unmanned aerial vehicle (UAV) 123 and a plurality of ground stations 104, each having a ground radio 102 and an OSPF router 105.

The inventive system and method may support scaling of multiple UAV 123 by providing a system and method allowing a single channel radio to process multiple channels of data carried on a single carrier frequency. Such a system may allow each of the plurality of airborne radios 101 to receive and transmit on sequential channels, which are simultaneously received and processed by the ground radio 102. Each ground radio 102 may receive a single carrier frequency, convert that carrier frequency to an intermediate frequency, and process that intermediate frequency for a plurality of basebands. The inventive system and method may include routing algorithms adapted to optimize the links between UAV 123 and ground radios 102 to connect the pair of radios for best performance of each UAV 123 even when a plurality UAVs 123 are operating in range of a single ground station.

Each ground station 104 may be in wireless or wired communication with an infrastructure network. This infrastructure network may support the connection between each airborne radio 101 and a ground radio 102. Each ground station 104 may include an open shortest path first (OSPF) router 105. This OSPF router 105 may build routing tables between each airborne radio 101 connected to ground radio 102 and the infrastructure network. The OSPF router 105 may populate the potential connections with performance data derived from the analyzed training sequences. From this performance data, the OSPF router 105 may choose the best ground station 102 and the best infrastructure connection yielding the highest throughput for each airborne radio 101.

Each ground radio 102 may be configured to process data carried on a plurality of channels. Each of the channels may be in one of three states, independent of the states of the other channels. In a disconnected state, the channel may not be in range of or in communication with any airborne radio 101. In a connected state, the channel may be in range of and connected to an airborne radio 101 of an AUV. In the connected state, the channel may calculate one or more performance vectors, which may be routed to the airborne radio 101 with which the channel is currently in communication. However, in the connected state, the performance vectors may not be adequate for the connection to carry traffic. In an active state, the channel may be in range of and connected to an airborne radio 101 of an AUV, the channel data may be utilized to calculate one or more performance vectors, which may be routed to the airborne radio 101 with which the channel is currently in communication. Also, in the active state, the performance vectors may be adequate for the connection between the given channel of the ground radio 102 and the airborne radio 101 to carry traffic. In the active state, the OSPF router 105 may use the connection between the airborne radio 101 and the channel of the ground radio 102 to pass command and/or control traffic and routing traffic.

The system network may be configured for point to multi-point operation. In such an embodiment, an airborne radio 101 may be the master station, also referred to as a base-station, and one or more channels of the ground radio 102 at each ground station 104 may subscribe to the broadcast of the airborne radio 101. The information transmitted from the airborne radios 101 may be accepted and processed by all ground radios 102 at each ground station 104. Control information may only be sourced by the airborne radio 101 from a single channel of a single ground radio 102 at any given time. Over a nominal mission, the ground radio 102 serving as the control source may change as the airborne radio 101 flies away from the ground station 104 at which the current ground radio 102 serving as the control source is located and closer to a new ground station 104 with a different ground radio 102. Channel performance may be calculated by the ground station 104 and that performance may be shared with the airborne radio 101.

The airborne radio 101 may be a single channel variant and may operate as a base station. The airborne radio 101 may register all ground stations 104 in range and assign those ground stations bandwidth with the uplink portion of the frame. The airborne radio 101 may attempt to demodulate and decode all the transmission from the subscribed ground stations 104 and use the performance metrics derived from the demodulation process to update the channel metrics in the routing table.

Only the ground radio 102 may operate as a multi-channel receiver and attempt to process all channels received up through the training sequence that are registered to a base station. However, in one embodiment, to save computation resources, only those channels designated as a primary or secondary connection will perform the demodulation and decoding function.

The ground radio 102 receiver may respond with a received signal strength indication of the signal received from the airborne radio 101 transmitter. Each airborne radio 101 may adjust the output power such that the signal received by the ground station 104 is operating at an error rate better than $1 \times 10^{-6}$ bit-error-rate. This may ensure that signal from the airborne radios 101 closest to the ground station 104 do not force the ground radio 102 receiver to add significant loss to the receive chain thereby limiting the ability to process all of the adjacent channels.

Performance for the uplink (control) connections may also be monitored by the airborne radio 101 or other equipment carried by the UAV 123.

Each ground radio 102 may be tuned to the same frequency as an airborne radio 101 allowing all ground radios 102 in range to hear and decode information form the airborne radio 101.

The system may utilize the Open Shortest Path First (OSPF) link state routing protocol. In such an embodiment, connection performance may be included with the endpoints in the OSPF routing table, Routing software may be executed by each UAV 123 to choose the best channel to utilize based on the available connections and the likely best connection information provided by ground radio 102.

Each ground radio 102 may use adjacent communication channels to support a single airborne radio 101, allowing the ground radio 102 to support a number of UAV 123 equal to the number of channels being processed by the ground radio 102. Each ground radio 102 may receive a signal from all airborne radios 101 in range of the ground radio 102, The ground radio 102 or other device located at the ground station 104 may analyze the channel quality for each UAV 123 in range of the ground radio 102. Only the link representing the best performance in the network would be active and used to pass data between the airborne radio 101 and the ground radio 102.

Each airborne radio 101 and ground radio 102 may include a front end, which is a combination of analog components and digital components yielding a baseband I and Q at the input of the waveform demodulator. The radio front end may be designed to amplify the electrical energy from the antenna to a baseband signal of sufficient power to be accurately converted into a form that can be detected, equalized, demodulated, and decoded.

Figure 2:
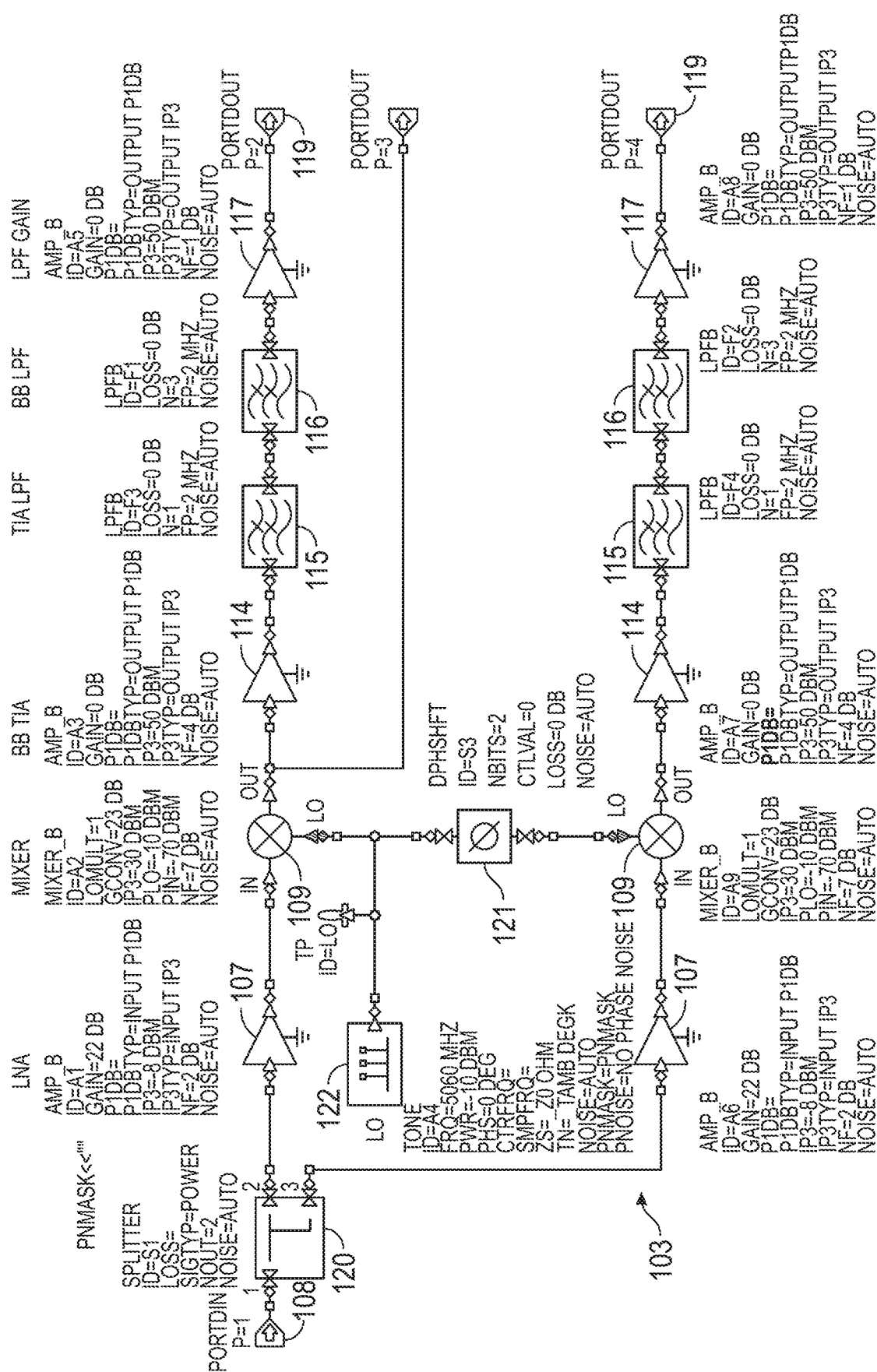
FIG. 2 is a schematic view of an analog front end of a radio according to an embodiment of the present invention.

Existing radios may be configured to receive a plurality of channels using virtual radios 103, Each of the virtual radios 103 may comprise a different channel and may communicate independently of the other virtual radios 103. As depicted in FIG. 2, a transceiver 108 may receive a signal and provide it to the analog front end. A typical front end may include a low noise amplifier, a down converter, baseband gain and filtering, automatic gain control, digital signal processing, analog to digital conversion, detection, equalization, demodulation, and decoding.

In an exemplary analog front end, the signal may be provided to a splitter 120. The splitter 120 may provide one signal to a first channel and another signal to a second channel. Each channel may have the same processing characteristics, as depicted in FIG. 2. Upon exiting the splitter 120, the signal may be provided to an RF signal to a low noise amplifier 107, The low noise amplifier 107 may set the input noise figure of the radio and also buffer the input of a transceiver 108. The RF frequency may be directly down-converted to baseband with a locally generated oscillator phase locked to an external frequency reference. In one embodiment, the external frequency reference may be a 40 MHz oscillator. Both sine and cosine outputs from the local oscillator may yield separate 1 and Q outputs. Direct conversion puts half of the waveform bandwidth in I and the other half in Q.

The low noise amplifier 107 may provide an output, which is received by a mixer 109. Mixers 109 of different channels may be connected to one another through a phase shifter 121 which receives an input from a tone generator 122 and provides outputs to each mixer 109. The output of the mixer 109 may drive a baseband trans-impedance amplifier 114. The output of the baseband trans-impedance amplifier 114 may be received by a programmable single pole low pass filter 115. The output of the programmable single pole low pass filter 115 may be provided to a third order low pass filter 116. The output of the third order low pass filter 116 may be provided to a programmable gain stage 117. The four filters 114, 115, 116, 117 orders may be programmable. They may be programmed in the order depicted in FIG. 2 to eliminate the portion of the down-converted spectrum that would fold back into the passband when converted to digital. An analog to digital converter 118 may be oversampled to attenuate out of band products. The analog to digital converter 118 may be located in the transceiver 108. In one embodiment, the analog to digital converter 118 may be oversampled at 32 time the digital output of the transceiver 108 resulting in an 80 dB attenuation of out of band products.

Figure 3:
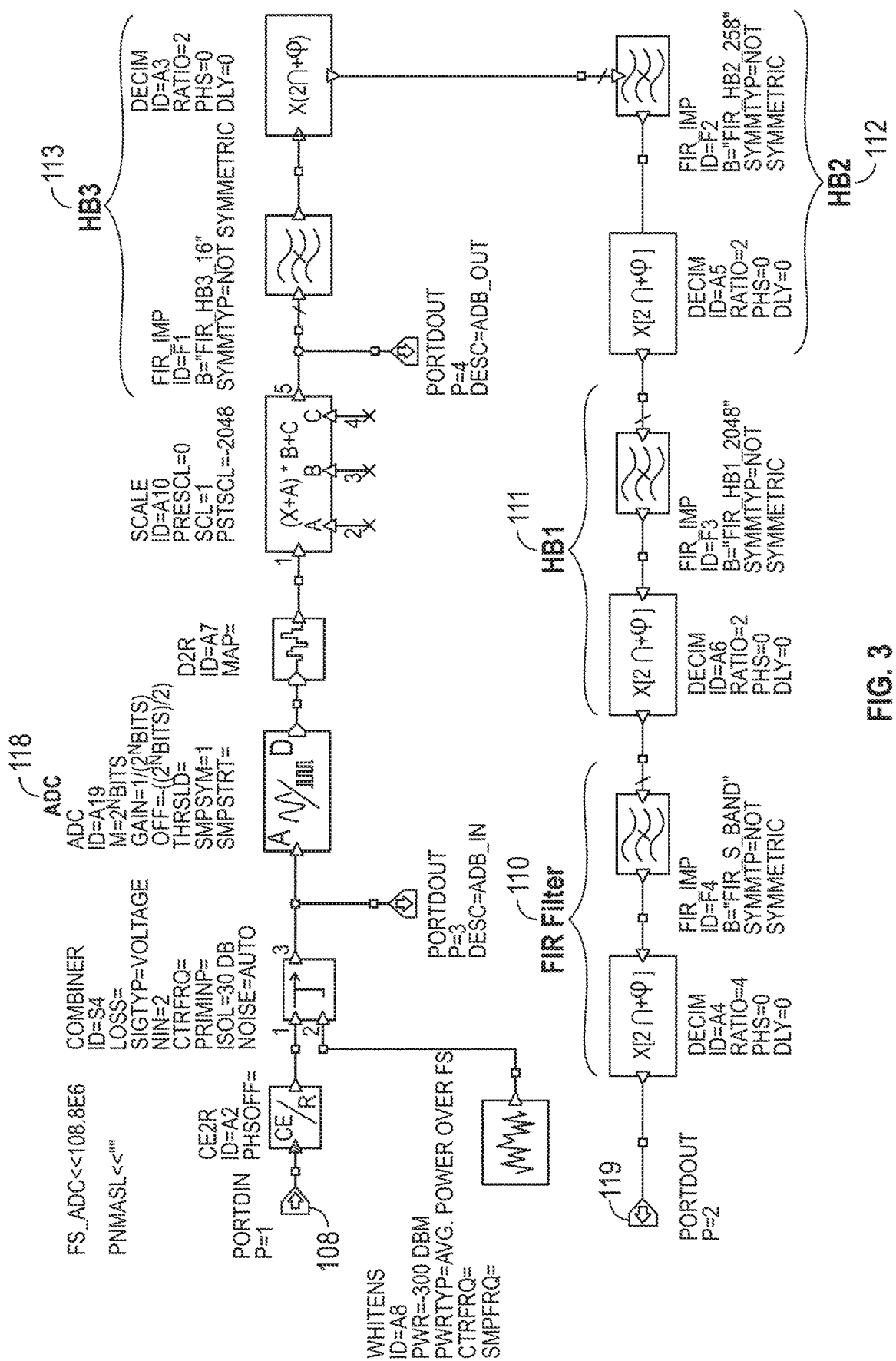
FIG. 3 is a schematic view of a digital front end of a radio according to an embodiment of the present invention.
Figure 4:
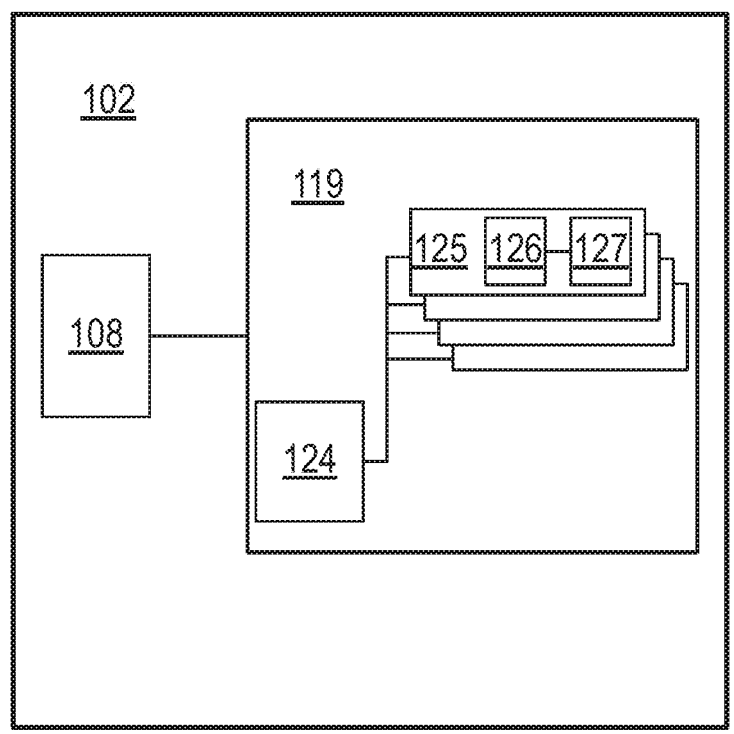
FIG. 4 is a block diagram of a ground radio according to an embodiment of the present invention.

As depicted in FIG. 3, the digital front end may include three half band filters 111, 112, 113 and a programmable finite impulse response (FIR) filter 110. The clock rates for each decimation function may be as specified in Table 1.

TABLE 1

Digital Front-End Configuration

| Function | Output Rate (MHz) | Notes |
|---|---|---|
| A to D Clock | 108.8 | |
| Half Band Filter 3 (113) | 54.4 | |
| Half Band Filter 2 (112) | 27.2 | |
| Half Band Filter 1 (111) | 13.6 | |
| FIR Filter (110) | 3.4 | Configured as a 4 to 1 decimator |

Based on a configuration as depicted in Table 1, the bandwidth of the signal output from the programmable FIR filter 110 and presented to a processing device 119 may be 1.7 MHz for each I and Q yielding a total bandwidth of 3.4 MHz. The total decimation may be 32 to 1 and the information folding into the passband due to the performance of the analog front end may be down more than 80 dB. The processing device 119 may be a microprocessor, FPGA, ASIC, or the like.

The digital front end may be physically incorporated in the transceiver 108. Decimation is the process of eliminating sample clocks. Each half band filter 111, 112, 113 may be a decimator with the purpose of reducing the sample clock by a factor of two without losing any of the information carried in the original passband. Without any prior modification of the data, the reduction of the clock would cause the upper half of the passband to fold along the halfway line into the lower half of the passband. Therefore, a proper half-band decimator must first remove all the content from the upper half before the decimation to keep any information in the upper passband from corrupting the information that will be kept in the lower half. FIR filter 110 may be employed to perform this function. FIR filter 110 may be designed to have a minimal effect on the lower passband (low passband ripple) and a maximum rejection in the upper passband.

In one, there may be three half-band decimators 111, 112, 113. Half band filter 111 may have the most coefficients and therefore be capable of exhibiting the most rejection of the upper half of the passband, Half band filter 112 may have less rejection of the upper half than half band filter 111, but more than half band filter 113. While half band filter 113 may have less rejection of the upper half than both half band filters 111 and 112.

One, two, or three half band filters may be used in any embodiment. In embodiments in which half band filter 113 is utilized, half band filter 112 should also be utilized. In embodiments in which half band filter 112 is utilized, half band filter 111 should also be utilized, Care should be taken when utilizing these filters to ensure that spurs and unwanted information captured by the analog to digital converter 118 does not inadvertently end up in the passband of interest.

Regardless of the number of half band filter decimators utilized, a programmable FIR filter 110 may receive the output of the half band filter decimation chain. The programmable FIR filter 110 may provide more coefficients than any of the half ban filters 111, 112, 113 and therefore offer the best decimation performance. Coefficients may be calculated to keep the signal of interest and reject all other information. The FIR filter 110 may be programmed for division by two, three or four.

Data output by the FIR filter 110 may be presented to a processing device 119. The bandwidth presented to the processing device 119 may be 3.4 MHz (half in I and Half in Q). The waveform may require a bandwidth of 170 KHz. Therefore, the processing device 119 may provide an additional decimation rate of 20 to 1 to achieve the desired sample dock. In embodiments in with another bandwidth is required, the processing device 119 may provide an alternate decimation rate as required to achieve the desired bandwidth. A person having ordinary skill in the art would understand how to determine the decimation rate required by the processing device 119. The high-order FIR filter 110 is designed to reject all out of band products before the information is provided to the processing device 119 for further decimation.

The processing device 119 may implement passband processing. Specifically, the processing device 119 may implement Gaussian Minimum Shift Key (GMSK) technology as described below, which is a variation of Phase Shift Key (PSK) technology. Use of this technology may address the extended bandwidth created by the discontinuities caused by the instantaneous change in phase at the bit transition. Theoretical PSK may generate a Bessel function in the frequency domain with side lobes that extend for orders of magnitude from the main transmission lobe.

GMSK is based on Quadrature Phase Shift Key (QPSK), which modulates two bits (identified as In Phase and Quadrature Phase), generating a constellation with the modulation points separated by 90 degrees. MSK first shifts the quadrature bit by half the bit time (Offset QPSK) to reduce the worst-case transition distance from 180 degrees for conventional QPSK to 90 degrees. MSK further reduces the bandwidth by encoding each bit as a half sinusoid significantly reducing the discontinuities at the bit change point. Gaussian MSK may reduce the bandwidth even further by applying at Gaussian filter to the data stream forcing the information into a known bandwidth defined by the product of the bit clock period and the unfiltered bandwidth (BT Product).

In one embodiment, a bandwidth Time product (BT) of 0.2 may be used by the processing device 119. A GMSK bit dock rate may be established to create a baseline for analysis. In one embodiment, the GMSK bit dock may be 85 KHz. Assuming the peak of the transmitted signal occurs at 0 dB, the bandwidth of the transmitted signal may include all energy above −40 dBc with respect to the peak.

A gaussian filter may be applied to the Minimum Shift Key signal, which may result in undesirable smearing of the information in time. The smear, referred to as inter-symbol interference, may be greater than 2 bit-docks in length for a BT=0.2. In addition to the inter-symbol interference applied by the modulator, the channel characteristic to include fading, multipath and doppler must also be canceled to recover the original modulated information.

Because the modulator shifted the quadrature data by half the clock, the data can only transition over 90 degrees of the constellation. Therefore, the received signal may be applied to a maximum likelihood demodulator that attempts to optimize the output by choosing the most likely transition that does not violate the 90-degree rotation. This effectively removes the inter-symbol interference created by the gaussian filter In one embodiment, the GMSK transmission burst may begin with a preamble that includes a training sequence with a known spectral characteristic. An equalizer may compare the received training sequence to the known spectral characteristic to derive the transfer function of the effects applied to the received waveform to include the gaussian filter and all the environmental characteristics. A matched filter may then be applied to the received waveform specified by coefficients that represent the conjugate of the derived channel characteristic. This filter may restore the waveform to its original response.

GMSK modulation, along with transmission channel characteristics, may combine to create distortion in data received by a radio 101, 102. This distortion must be corrected before reliable bit decoding can occur. In one embodiment, the distortion may be removed using GMSK modulation. The baseband representation of the GMSK modulated signal is:

$$s(t) = \sum_n InPt(t - nT)$$

where $I_n=\pm 1$ for n odd and $\pm j$ for n even are the information symbols to be transmitted and Pt(t) is the baseband gaussian pulse with a BT=0.2.

The following transmission channel model may be used, representing a multipath delay spread channel:

$$h(t)=\Sigma_{k=0}^{K-1}h_k\delta(t-\tau_k)$$

where $h_k$ is the instantaneous gain of the $k^{th}$ tap, $\tau_k$ is the time delay of the $k^{th}$ tap, and $\delta(t)$ is the Dirac delta function.

The received signal r(t) is then represented as the baseband transmitted signal being passed through the multipath channel with additional co-channel interference added as n(t):

$$r(t)=\Sigma_n I_n p(t-nT)+n(t)$$

This received signal is processed by a 16 state MLSE (maximum likelihood sequence estimator) equalizer which is implemented using a matched filter and a Viterbi equalizer. The matched filter coefficients are created by:

$$g_{MF}(t)=p_{TS}*(-t)$$

where p(t) is the channel estimate derived from the impulse response of the pulse shaped training sequence $p_{TS}$.

The output of the MLSE are soft decisions of the data symbols corresponding to the maximum likelihood sequence estimate of the transmitted symbols.

Each of these processing steps must be performed on each channel of data for known radios using a single receiver/transmitter set.

The inventive ground radio 102 may be implemented using a single channel direct-conversion radio (i.e., a single transmitter/receiver set), but may be operable to receive data on a plurality of channels, Such an implementation may allow a plurality of channels to be received using a single transmitter/receiver set thereby reducing the complexity of the circuitry required to process multiple channels.

A single carrier frequency may be received by the ground radio 102. This signal may be converted to an intermediate frequency. In one embodiment, by way of example, and not as a limitation, the intermediate frequency may be 850 kHz. The intermediate frequency may be the center of the plurality of adjacent frequencies on which data is to be received. The intermediate frequency may be chosen to be high enough to preserver the entire range over which all channels of data may be carried. The range may include guard band between each channel. The range over which any single channel of data may be carried may be referred to as an interval. Guard band may exist between adjacent channels. In one embodiment, a guard band may be added to each interval to calculate the total frequency range over which data may be processed.

Each RF front end, as depicted in FIGS. 2 and 3 may be tuned to process the waveform received and provide the intermediate frequency to a digital signal processor (DSP) 119. The intermediate frequency may include a plurality of channels to be processed by the DSP. In one embodiment, the transceiver 108 may receive a 2 GHz carrier frequency and provide a 850 kHz intermediate frequency to the DSP. That data may be converted from 2 GHz to 850 kHz using the system and method as described above, which may be a down converter 124. In this example, the 850 kHz signal, the intermediate frequency, provided to the DSP includes four channels of data.

The DSP may process the intermediate frequency data individually for each of the plurality of channels carried by the intermediate frequency. In an embodiment in which four channels are carried by the intermediate frequency data, the DSP 119 may have a plurality of processing paths 125. Each of the plurality of processing paths 125 may individually process the four channels of data consistent with traditional single channel system. Each of the channels carried by the intermediate frequency will be individually converted to baseband by a down converter 126 and may then be filtered by a narrow low pass FIR filter 127. By way of example, and not as a limitation, in an embodiment with an intermediate frequency of 850 kHz, there may be four channels with center frequencies at 527.5 kHz, 742.5 kHz, 957.5 kHz, and 1172.5 kHz. Each of these frequencies may have some frequency error cause by fixed error in the oscillators of the transmitters and by doppler shift from the velocity vector of the UAV 123. Each multiply down to baseband may be offset by the correction required to properly center the receive channel in light of the frequency error.

After each channel is multiplied down to its baseband by the down converter 126, a narrow low pass FIR filter 127 may be applied to the baseband channel to eliminate the adjacent channels for the passband. In one embodiment, by way of example, and not as a limitation, the down converter 126 may have a passband of 170 kHz and a minimum rejection of 50 dB at the 215 kHz band edges. The narrow low pass FIR filter 127 may prevent information in adjacent channels from interfering with the signal of interest.

Each channel of the ground radio 102 may process a training sequence to identify timing synchronization and compute the match filter transfer function. The training sequence may also be analyzed for signal quality and the results of this analysis may populate the quality metrics for the OSPF router.

The airborne radio 101 may assign each ground radio 102 station bandwidth with the uplink portion of the frame. The airborne radio 101 may attempt to demodulate and decode all transmissions from the subscribers and us the performance metrics derived from the demodulation process to update the channel metrics in the routing table.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A communication system for a plurality of unmanned aerial vehicles operating beyond visual line of sight comprising:
a first airborne radio carried by a first unmanned aerial vehicle and adapted to transmit a first waveform at a carrier frequency with a first baseband frequency;
a second airborne radio carried by a second unmanned aerial vehicle and adapted to transmit a second waveform at the carrier frequency with a second baseband frequency;
a plurality of ground radios in wireless communication with both the first and second airborne radios,
wherein each of the plurality of ground radios is adapted to receive the carrier frequency and comprises: a processor adapted to calculate one or more performance metrics related to communication between the airborne radio and a respective one of the plurality of ground radios, and a circuit adapted to extract the first waveform and the second waveform, wherein the circuit further comprises: a transceiver adapted to receive the carrier frequency and provide an analog signal, a splitter adapted to receive the analog signal from the transceiver and provide a first signal and a second signal, a first channel having processing characteristics, adapted to receive the first signal from the splitter and provide a first channel output, wherein the first channel further comprises a first mixer, a first baseband trans-impedance amplifier, a first single pole low pass filter, a first third-order low pass filter, and a first programmable gain stage, a second channel having processing characteristics, adapted to receive the second signal from the splitter and provide a second channel output, wherein the processing characteristics of the first channel are the same as the processing characteristics of the second channel and
wherein the second channel further comprises a second mixer, a second baseband trans-impedance amplifier, a second single pole low pass filter, a second third-order low pass filter, and a second programmable gain stage, a phase shifter adapted to provide a first output to the first mixer and a second output to the second mixer, a tone generator adapted to provide a signal to the phase shifter, and a digital signal processor having a first processing path adapted to receive the first channel output and a second processing path adapted to receive the second channel output, wherein the digital signal processor is adapted to extract the first waveform by processing the first channel output on the first processing path at the first baseband frequency, and
wherein the digital signal processor is adapted to extract the second waveform by processing the second channel output on the second processing path at the second baseband frequency wherein each of the first and second airborne radios is a master station and selects one of the plurality of ground radios as an active ground radio based on the one or more performance metrics; and
wherein each of the first and second airborne radios is configured to receive control data only from the active ground radio.

2. The system of claim 1 wherein both the first and second airborne radios are configured as a master and each of the plurality of ground radios subscribes to each of the first and second airborne radios.

3. The system of claim 2 wherein the processor and the circuit of each of the plurality of ground radios processes data from both the first and second airborne radios.

4. The system of claim 1 further comprising:
an open shortest path first router having a routing table containing the one or more performance metrics of each of the plurality of ground radios.

5. The system of claim 4 wherein the processor of the active ground radio utilizes the routing table to execute an algorithm to select an active ground radio to increase throughput between each of the first and second airborne radios and the respective active ground radios.

6. The system of claim 5 wherein the processor of each of the plurality of ground radios executes a training sequence and derives the one or more performance metrics from communication received from each of the first and second airborne radios during the training sequence.

7. The system of claim 1 wherein each of the plurality of ground radios comprises a single receiver adapted to receive a plurality of data channels centered at an intermediate frequency; and
the circuit of each of the plurality of ground radios is adapted to process the plurality of data channels.

8. The system of claim 7 wherein the circuit comprises a down converter adapted to receive the plurality of data channels and convert to an intermediate frequency signal having the intermediate frequency.

9. The system of claim 8 wherein the circuit comprises a plurality of processing paths wherein each of the plurality of processing paths is adapted to receive the intermediate frequency signal having the plurality of data channels and process one of the plurality of data channels; and
wherein each of the plurality of processing paths operates simultaneously.

10. The system of claim 9 wherein each of the plurality of processing paths comprises a baseband converter adapted to convert one of the plurality of data channels to a unique baseband frequency signal having a unique baseband frequency; and
wherein a center frequency of each of the unique baseband frequencies is unique to each of the data channels.

11. The system of claim 10 wherein each of the plurality of processing paths comprises a narrow low pass finite impulse response filter adapted to discriminate a target data channel from the rest of the plurality of data channels.

12. The system of claim 10 wherein the center frequency of each of the plurality of data channels are uniformly distributed around the intermediate frequency.

13. The system of claim 12 wherein each center frequency is an interval away from each adjacent center frequency.

14. A communication system for a plurality of unmanned aerial vehicles operating beyond visual line of sight comprising:
a first airborne radio carried by a first unmanned aerial vehicle and adapted to transmit a first-waveform at a carrier frequency with a first baseband frequency; a second airborne radio carried by a second unmanned aerial vehicle and adapted to transmit a second waveform at the carrier frequency with a second baseband frequency;
a plurality of ground radios in wireless communication with both the first and second airborne radios, wherein each of the plurality of ground radios is adapted to receive the carrier frequency and comprises: a processor adapted to calculate one or more performance metrics related to communication between the airborne radio and a respective one of the plurality of ground radios, a circuit adapted to extract the first waveform and the second waveform, and an open shortest path first router having a routing table containing the one or more performance metrics of each of the plurality of ground radios;

wherein the circuit further comprises: a transceiver adapted to receive carrier frequency and provide an analog signal, a splitter adapted to receive the analog signal from the transceiver and provide a first signal and a second signal, a first channel having processing characteristics, adapted to receive the first signal from the splitter and provide a first channel output, wherein the first channel further comprises a first mixer, a first baseband trans-impedance amplifier, a first single pole low pass filter, a first third-order low pass filter, and a first programmable gain stage, a second channel having processing characteristics, adapted to receive the second signal from the splitter and provide a second channel output, wherein the processing characteristics of the first channel are the same as the processing characteristics of the second channel and wherein the second channel further comprises a second mixer, a second baseband trans-impedance amplifier, a second single pole low pass filter, a second third-order low pass filter, and a second programmable gain stage, a phase shifter adapted to provide a first output to the first mixer and a second output to the second mixer, a tone generator adapted to provide a signal to the phase shifter, and a digital signal processor having a first processing path adapted to receive the first channel output and a second processing path adapted to receive the second channel output, wherein the digital signal processor is adapted to extract the first waveform by processing the first channel output on the first processing path at the first baseband frequency, and wherein the digital signal processor is adapted to extract the second waveform by processing the second channel output on the second processing path at the second baseband frequency wherein each of the first and second airborne radios is a master station and selects one of the plurality of ground radios as an active ground radio based on the one or more performance metrics;

wherein each of the first and second airborne radios is configured to receive control data only from a respective active ground radio; wherein the processor of the current respective active ground radio utilizes the routing table to execute an algorithm to identify a subsequent respective active ground radio; and wherein the throughput between the subsequent respective active ground radio and the current respective airborne radio is higher than the throughput between the current respective active ground radio and the first or second airborne radio respectively.

15. The system of claim 14 wherein the processor of each of the plurality of ground radios receives a training sequence and derives the one or more performance metrics from communication received from each of the first and second airborne radios during the training sequence.

16. The system of claim 14 wherein each of the plurality of ground radios comprises a single receiver adapted to receive a single carrier frequency; and the circuit of each of the plurality of ground radios is adapted to process a plurality of data channels and comprises:
a down converter adapted to convert one of the plurality of data channels to a baseband frequency, and
a plurality of processing paths wherein each of the plurality of processing paths is adapted to receive one of the plurality of data channels simultaneously with processing other of the plurality of data channels by other of the plurality of processing paths.

17. The system of claim 16 wherein each of the plurality of processing paths comprises a down converter adapted to convert one of the plurality of data channels to a baseband frequency signal having a baseband frequency; and
wherein a center frequency of each of the plurality of data channels is unique.

18. The system of claim 17 wherein the center frequencies of the plurality of data channels are uniformly distributed around the intermediate frequency.

19. The system of claim 18 wherein each of the plurality of data channels is an interval away from each adjacent data channel.

20. A communication system for a plurality of unmanned aerial vehicles operating beyond visual line of sight comprising:
a first airborne radio carried by a first unmanned aerial vehicle and adapted to transmit a first waveform at a carrier frequency with a first baseband frequency; a second airborne radio carried by a second unmanned aerial vehicle and adapted to transmit a second waveform at the carrier frequency with a second baseband frequency;
a plurality of ground radios in wireless communication with both the first and second airborne radios, wherein each of the plurality of ground radios is adapted to receive the carrier frequency and comprises:
a single receiver adapted to receive a plurality of data channels, a down converter adapted to convert the plurality of data channels to an intermediate frequency signal having an intermediate frequency, a processor adapted to execute a training sequence and derive one or more performance metrics from communication received from the first and second airborne radios during the training sequence, to process a plurality of data channels entered at the intermediate frequency, and further comprising: a plurality of processing paths wherein each of the plurality of processing paths is adapted to receive the plurality of data channels and process one of the plurality of data channels simultaneously with processing other of the plurality of data channels by other of the plurality of processing paths and wherein each of the plurality of processing paths comprises a baseband converter adapted to convert each of the plurality of data channels to a baseband frequency signal having a center frequency unique to each of the other data channels, and a circuit adapted to extract the first baseband frequency from the first waveform and the second baseband frequency from the second waveform, wherein the circuit further comprises:
a transceiver adapted to receive the carrier frequency and provide an analog signal, a splitter adapted to receive the analog signal from the transceiver and provide a first signal and a second signal, a first channel having processing characteristics, adapted to receive the first signal from the splitter and provide a first channel output, wherein the first channel further comprises a first mixer, a first baseband trans-impedance amplifier, a first single pole low pass filter, a first third-order low pass filter, and a first programmable gain stage, a second channel having processing characteristics, adapted to receive the second signal from the splitter and provide a second channel output, wherein the processing characteristics of the first channel are the same as the processing characteristics of the second channel and wherein the second channel further comprises a second mixer, a second baseband trans-impedance amplifier, a second single pole low pass filter, a second third-order low pass filter, and a second programmable gain stage, a phase shifter adapted to provide a first output to the first mixer and a second output to the second mixer, a tone generator adapted to provide a signal to the phase shifter, and a digital signal processor having a first processing path adapted to receive the first channel output and a second processing path adapted to receive the second channel output, wherein the digital signal processor is adapted to extract the first waveform by processing the first channel output on the first processing path at the first baseband frequency, and wherein the digital signal processor is adapted to extract the second waveform by processing the second channel output on the second processing path at the second baseband frequency;

wherein the baseband frequencies of the plurality of processing paths are distributed uniformly around the intermediate frequency and each baseband frequency is an equal interval away from each adjacent baseband frequency; and an open shortest path first router having a routing table containing the one or more performance metrics of each of the plurality of ground radios; wherein each of the first and second airborne radios is a master station and selects one of the plurality of ground radios as an active ground radio based on the one or more performance metrics;

wherein the first airborne radio is configured to receive control data only from a current active ground radio;

wherein the processor of the current active ground radio utilizes the routing table to execute an algorithm to identify a subsequent active ground radio; and wherein an expected throughput between the subsequent active ground radio and the first airborne radio is higher than an expected throughput between the current active ground radio and the first airborne radio.

* * * * *